United States Patent Office 3,784,630
Patented Jan. 8, 1974

3,784,630
DIMERIZATION OR CODIMERIZATION OF α-OLEFINS
Neil A. Maly, Tallmadge, Henry R. Menapace, Stow, and Gerald S. Benner, Tallmadge, Ohio, assignors to The Goodyear Tire & Rubber Company, Akron, Ohio
No Drawing. Filed Mar. 9, 1972, Ser. No. 233,363
Int. Cl. C07c 3/10
U.S. Cl. 260—683.15 D                    9 Claims

ABSTRACT OF THE DISCLOSURE

There is disclosed a process for the dimerization or codimerization of α-olefins by means of a catalyst system comprising (A) an organometallic compound, (B) a nitrogen-containing ligand and (C) the reaction product of a tungsten halide and a phenolic compound.

---

This invention is directed to a process for the dimerization or codimerization of α-olefins by means of a catalyst system comprising (A) an organometallic compound, (B) a nitrogen-containing ligand and (C) the reaction product of a tungsten halide and a phenolic compound.

By the term olefin dimerization is meant that two moles of an olefin are dimerized, for instance, two moles of propylene are dimerized to produce one mole of hexene. By the term codimerization is meant that two dissimilar olefins are dimerized to form a new olefin, for instance, one mole of propylene is codimerized with one mole of 1-butene to form one mole of α-heptene.

The olefins which are dimerized or codimerized in accordance with this invention are olefins containing from 2 through 8 carbon atoms and may be straight or branched chain olefins. Representative of such olefins are ethylene, propylene, 1-butene, isobutene, 1-heptene, 2-methyl-1-butene, 2-ethyl-1-butene, 1-hexene, 2-methyl-1-pentene, 2-methyl-1-hexene, 1-pentene, 2-methyl-1-heptene, 1-octene and other branched or straight chain olefins containing from 2 through 8 carbon atoms.

According to the invention, olefins containing from 2 through 8 carbon atoms are dimerized or codimerized by means of a catalyst comprising, (A) at least one organometallic compound selected from the group consisting of:

$$R_nMX_{3-n}$$
and
$$R_3M_2X_3$$

wherein R is an alkyl radical containing from 1 through 10 carbon atoms, X is a halogen from the group of chlorine, bromine and iodine, $n$ is at least 1 but not more than 2 and M is from the group of aluminum, indium, boron and gallium;

(B) at least one ligand of the formula:

$$NR_1R_2R_3$$

wherein $R_1$ is selected from the group of hydrogen, alkyl, cycloalkyl, alkenyl and aralkyl; $R_2$ is selected from the group of alkyl, cycloalkyl, alkenyl, aryl, arakyl and alkaryl; and $R_3$ is selected from the group of hydrogen, alkyl, cycloalkyl, alkenyl and aralkyl; and wherein $R_1$, $R_2$ and $R_3$ contain from 1 through 20 carbon atoms; and if $R_2$ is aryl or alkaryl, then at least one of $R_1$ and $R_3$ must be hydrogen, and;

(C) the reaction product of (1) at least one tungsten salt selected from the group consisting of tungsten hexachloride, tungsten hexabromide, tungsten pentachloride, tungsten pentabromide, tungsten oxytetrachloride, tungsten oxytetrabromide and tungsten oxytetraiodide and (2) at least one phenolic compound selected from the group of:

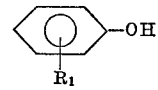

wherein $R_1$ is selected from the group of hydrogen, $NO_2$, Cl, F, Br, phenyl, $OCH_3$, $OC_2H_5$ and an alkyl radical containing from 1 through 10 carbon atoms and in which $R_1$ is in the 2, 3 or 4 position on the ring:

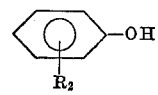

wherein $R_2$ is selected from the group of COOR′, wherein R′ is hydrogen or an alkyl containing from 1 through 12 carbon atoms, and in which $R_2$ is in the 2, 3 or 4 position on the ring:

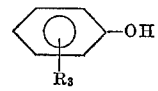

wherein $R_3$ is selected from the group of COR″, wherein R″ is hydrogen, an alkyl containing from 1 through 12 carbon atoms, or phenyl, and $R_3$ is in the 2, 3 or 4 position on the ring, and:

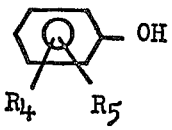

wherein $R_4$ and $R_5$ are selected from the group of Cl, Br and an alkyl containing from 1 through 10 carbon atoms and $R_4$ and $R_5$ are in the 2,3; 2,4; 2,5; 2,6; 3,4; or 3,5 positions on the ring.

In the practice of this invention, it is generally desirable to conduct the dimerization or codimerization as a continuous process. However, batch processes may be successfully employed. The temperature at which the dimerization or codimerization reaction of this invention is conducted depends somewhat on the reactants employed and the rate of reaction desired. Generally temperatures ranging from about 0° C. to about 150° C. are employed with about 20° C. to about 80° C. being more preferred.

If a continuous process is employed, the rate at which the process is conducted, again, will depend on the temperature employed and the conversion desired. The rate is usually indicated as liquid residence times. In this invention residence times will vary from about 1 minute to 3 hours with 5 minutes to 1 hour being more preferred.

The pressure of the dimerization or codimerization process has not been found to be too critical and may vary broadly from about 0 to about 1000 pounds per square inch gauge (p.s.i.g.) with about 50 to about 500 p.s.i.g. being more preferred.

In the practice of this invention, it is usually desirable to employ pure olefins as the only reactants. However, it may be desirable to employ a diluent for such reasons as a heat transfer medium and the like. If a diluent is employed, it should obviously not react with either the reactant or the resulting products. Representative of such inert diluents may be the paraffin hydrocarbon such as hexane, pentane, propane, as well as other gases or liquids which are known to be inert. Also suitable are chlorobenzene, benzene and the like.

The first catalyst component is a reducing agent responding to the formulae:

$$R_nMX_{3-n}$$

or $$R_3M_2X_3$$

wherein $n$ is a whole number of at least one and not more than two; R is an alkyl radical containing from 1 to 10 carbon atoms; and X is a halogen such as chlorine, bromine or iodine; and M is a metal from the group of boron, aluminum, gallium and indium. Representative of such compounds are ethylaluminum dichloride, diisobutylaluminum bromide, propylaluminum diiodide, hexylaluminum bromide, diethylaluminum chloride, decylaluminum diiodide, diheptylaluminum chloride, ethylaluminum sesquichloride, ethylaluminum sesquibromide and the like. Also representative of the compounds useful in this invention are ethyl boron dichloride, diisobutyl boron bromide, hexyl boron iodide, diethyl boron fluoride, diheptyl boron chloride and the like. Also useful in this invention are the gallium and indium compounds as set forth above, where gallium and indium are substituted for aluminum and boron. It is preferred to employ ethylaluminum dichloride, ethylaluminum sesquichloride or diethylaluminum chloride.

The second catalyst components are certain nitrogen-containing ligands responding to the formula:

$$NR_1R_2R_3$$

wherein $R_1$ is selected from the group of hydrogen, alkyl, cycloalkyl, alkenyl and aralkyl; $R_2$ is selected from the group of alkyl, cycloalkyl, alkenyl, aralkyl, aryl and alkaryl; $R_3$ is selected from the group of hydrogen, alkyl, cycloalkyl, alkenyl and aralkyl; and if $R_2$ is aryl or alkaryl, then at least one of $R_1$ and $R_3$ must be hydrogen.

Representative of ligands responding to this formula are dimethylpentenylamine,
methylpentenylamine,
cyclopentylmethylamine,
2-chlorocyclopentylamine,
benzylamine,
4-chlorobenzylamine,
phenylbutenylamine,
phenylbutylamine,
4-chlorophenylmethylamine,
phenylcyclopentylamine,
2-chloroaniline,
4-chloroaniline,
4-methoxyaniline,
4-methylaniline,
cyclohexylamine,
2-methylcyclohexylamine,
4-chloro-2-methylaniline,
dicyclohexylamine,
4-chlorocyclohexylamine,
phenylcyclohexylamine,
4-carbomethoxyaniline,
4-nitroaniline,
4-diethylaminoaniline,
tributylamine,
triisobutylamine,
methylamine,
t-butylamine,
cyclopentylamine,
aniline,
2-methylaniline,
3-butylaniline,
2-nitroaniline,
2,4-dimethylaniline,
3,5-dimethylaniline,
2,6-dimethylaniline,
2,6-dimethyl-4-bromoaniline.

Also amines wherein the nitrogen atom constitutes a part of a heterocyclic saturated ring may be used; such a compound is represented by 4-methyl piperidine and other substituted piperidines; also tetrahydropyrroles and substituted tetrahydropyrroles, also piperazines and substituted piperazines. It is preferred to employ aniline, 2-methyl or 4-methyl aniline, 2-nitro or 4-nitro aniline, 3-butylaniline, cyclohexylamine, dibutylamine, 2,4-dimethylaniline or 2,6-dimethylaniline.

The third catalyst component of this invention is the reaction product of a tungsten salt and a phenolic compound. Representative of the tungsten salts employed are tungsten hexachloride, tungsten hexabromide, tungsten pentachloride, tungsten pentabromide, tungsten oxytetrabromide, tungtsen oxytetrachloride and tungsten oxytetraiodide.

The phenolic compounds employed to react with the tungsten halide of this invention are phenols or substituted phenols. One class of phenolic compounds may be represented by the formula:

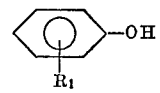

wherein $R_1$ is selected from the group of hydrogen, $NO_2$, Cl, F, Br, phenyl, $OCH_3$, $OC_2H_5$ and an alkyl containing from 1 through 10 carbon atoms and in which $R_1$ is in the 2, 3 or 4 position on the ring. Representative of such phenolic compounds are 2 or 3 or 4 chlorophenol, 2 or 3 or 4 methylphenol, 2 or 3 or 4 nitrophenol, 2 or 3 or 4 methoxyphenol and 2 or 3 or 4 butylphenol. Phenol, 2-methylphenol and 4-chlorophenol are preferred.

Another class of phenolic compounds may be represented by the formula:

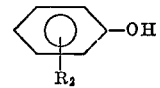

wherein $R_2$ is selected from the group of COOR', wherein R' is hydrogen or an alkyl containing from 1 through 12 carbon atoms and in which $R_2$ is in the 2, 3 or 4 position on the ring. Representative of such compounds are salicylic acid, methylsalicylate, butylsalicylate, dodecylsalicylate, 3 - carbomethoxyphenol, 4-carbomethoxyphenol, and 4-carbobutoxyphenol. Salicylic acid and methylsalicylate are preferred.

Still another class may be represented by the formula:

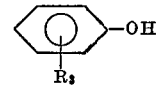

wherein $R_3$ is selected from the group of COR'', wherein R'' is hydrogen, an alkyl containing from 1 through 12 carbon atoms or phenyl, and $R_3$ is in the 2, 3 or 4 position on the ring. Representative of such compounds are 2-hydroxybenzophenone, 2 - acetophenol, salicylaldehyde, 2-benzoylphenol, 2 - pivaloylphenol and 3-butyroylphenol. Salicylaldehyde and 2 - hydroxybenzophenone are preferred.

The remaining class of phenolic compounds may be represented by the formula:

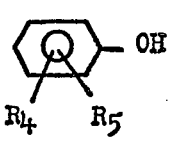

wherein $R_4$ and $R_5$ are selected from the group of Cl, Br and an alkyl containing from 1 through 10 carbon atoms, and $R_4$ and $R_5$ are in the 2,3; 2,4; 2,5; 2,6; 3,4; or 3,5; position on the ring. These may be represented by 2,6-dimethylphenol, 2,4-dichlorophenol, 2,4-dimethylphenol, 2-chloro - 4 - bromophenol, 2,4-diethylphenol, 3,4-dibutylphenol, 2,4-didecylphenol, 2-chloro-6-methylphenol and 2,6 - dichlorophenol. 2,4 and 2,6 dimethylphenol are preferred.

The preparation of the reaction product of the tungsten halides and the phenolic compounds is straight forward and requires no special technique. The usual practice is to react one mole of the desired tungsten halide with either one or two moles of the desired phenolic compound while they both are dissolved in an inert solvent such as chlorobenzene, pentane and the like. The tungsten halide is usually dissolved in the solvent at about 0.1 molarity and the proper amount of the phenolic compound added. Then the reaction product is usually analyzed to determine how much to use.

The amount of catalyst used in the process is not critical so long as a catalytic amount is employed. As little an amount of catalyst as 0.01 part by weight of the tungsten (with the other components in the proper ratios) has shown fair catalytic activity. The amount employed will, of course, depend on the rate of dimerization desired, and the pressure and temperature employed. Those skilled in the art will be able to determine the proper catalytic amount to employ without any difficulty.

The molar relationship between the catalyst components employed in this invention may vary quite widely. For instance, the molar relationship of the organometallic compound (M) to the molar relationship of the nitrogen-containing ligand (N) to the reaction product of the tungsten halide and the phenolic compounds (W) may vary in the relationship M/N/W of from 4 to 40/1 to 3/1. A more preferred ratio of the catalyst components would be M/N/W of from 10–20/1.5–2.5/1.

There is no particular technique required to prepare the catalyst of this invention. The catalyst may be prepared in situ or they may be pre-formed. By the term in situ is meant that each individual catalyst component is added to the reaction mixture. By the term pre-formed is meant that the catalyst components are pre-mixed and then added to the polymerization mixture. It is usually the practice to add the catalyst components while they are dissolved in one of the inert solvents mentioned herein. This is not an absolute requirement, but for better control of accuracy, this technique has been employed.

The practice of this invention may be further illustrated by reference to the following examples which are intended to be representative rather than restrictive of the scope of the invention.

In these examples tungsten hexachloride and the particular phenolic compounds were pre-reacted one mole for one mole while the WCl$_6$ was diluted to 0.1 molarity in chlorobenzene.

In a suitable reactor 0.02 mole of propylene were reacted with a catalyst of 0.002 mole of ethylaluminum sesquichloride, 0.0004 mole of aniline and 0.0002 mole of the reaction product of tungsten hexachloride and the various phenolic compounds listed in the table below.

8 carbon atoms are dimerized or codimerized by means of a catalyst comprising,
(A) at least one organometallic compound selected from the group consisting of:

and

wherein R is an alkyl radical containing from 1 through 10 carbon atoms, X is a halogen from the group of chlorine, bromine and iodine, $n$ is at least 1 but not more than 2 and M is from the group of aluminum, indium, boron and gallium;
(B) at least one ligand of the formula:

wherein $R_1$ is selected from the group of hydrogen, alkyl, cycloalkyl, alkenyl and aralkyl; $R_2$ is selected from the group of alkyl, cycloalkyl, alkenyl, aryl, aralkyl and alkaryl; and $R_3$ is selected from the group of hydrogen, alkyl, cycloalkyl, alkenyl and aralkyl; and wherein $R_1$, $R_2$ and $R_3$ contain from 1 through 20 carbon atoms; and if $R_2$ is aryl or alkaryl, then at least one of $R_1$ and $R_3$ must be hydrogen, and;
(C) the reaction product of (1) at least one tungsten salt selected from the group consisting of tungsten hexachloride, tungsten hexabromide, tungsten pentachloride, tungsten pentabromide, tungsten oxytetrachloride, tungsten oxytetrabromide and tungsten oxytetraiodide and (2) at least one phenolic compound selected from the group of:

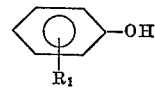

wherein $R_1$ is selected from the group of hydrogen, $NO_2$, Cl, F, Br, phenyl, $OCH_3$, $OC_2H_5$ and an alkyl containing from 1 through 10 carbon atoms and in which R is in the 2, 3 or 4 position on the ring:

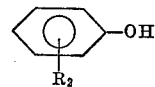

wherein $R_2$ is selected from the group of COOR', wherein R' is hydrogen or an alkyl containing from 1 through 12 carbon atoms and in which $R_2$ is in the 2, 3 or 4 position on the ring:

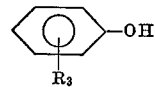

wherein $R_3$ is selected from the group of COR'', wherein R'' is hydrogen, an alkyl containing from

TABLE I

| | | | | Percent | | |
|---|---|---|---|---|---|---|
| Ex. | Phenolic compound | Conv. | Sel. | 4-methyl-pentenes | 2,3-dimethyl-1-butene | 2-methyl-1-pentene |
| 1 | 1 mole salicylaldehyde | 89 | 47 | 2.7 | 34 | 10 |
| 2 | 1 mole methylsalicylate | 94 | 99 | 7.7 | 53.5 | 37 |
| 3 | 1 mole phenol | 65 | 73 | 4.7 | 45 | 23 |
| 4 | 1 mole salicylic acid | 61 | 58 | 4.1 | 33 | 21 |
| 5 | 1 mole 2-hydroxybenzophenone | 28 | 96 | 7.9 | 45 | 42 |
| 6 | 1 mole butylsalicylate | 25 | 99.5 | 6.5 | 48 | 45 |
| 7 | 1 mole 4-chlorophenol | 83 | 82 | 3.6 | 51 | 27 |
| 8 | 1 mole 2-methylphenol | 66 | 68 | 4.6 | 40 | 23 |
| 9 | 1 mole 2-bromophenol | 70 | 75 | 4.9 | 47 | 23.5 |
| 10 | 1 mole 3-chlorophenol | 67 | 97 | 4.8 | 56 | 36 |

While certain representative embodiments and details have been shown for the purpose of illustrating the invention, it will be apparent to those skilled in this art that various changes and modifications may be made therein without departing from the spirit or scope of the invention.

What is claimed is:
1. A process in which olefins containing from 2 through

1 through 12 carbon atoms or phenyl and $R_3$ is in the 2, 3 or 4 position on the ring; and:

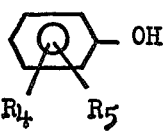

wherein $R_4$ and $R_5$ are selected from the group of Cl, Br and an alkyl containing from 1 through 10 carbon atoms and $R_4$ and $R_5$ are in the 2,3; 2,4; 2,5; 2,6; 3,4; or 3,5; position on the ring, in which one mole of the tungsten salt is reacted with one or 2 moles of the phenolic compound and in which the molar relationship between catalyst components (A)/(C) ranges from about 10/1 to about 20/1 and the molar relationship between catalyst components (B)/(C) ranges from about 1.5/1 to about 2.5/1.

2. The process according to claim 1 in which the α-olefin is propylene.

3. The process according to claim 1 in which the organometallic compound is selected from the group of ethylaluminum dichloride, diethylaluminum chloride and ethylaluminum sesquichloride.

4. The process according to claim 1 in which the ligand of the formula:

$$NR_1R_2R_3$$

is selected from the group of aniline, 2-methylaniline, 3-butylaniline, 4-methylaniline, 2-nitroaniline, 4-nitroaniline, cyclohexylamine, dibutylamine, 2,4-dimethylaniline and 2,6-dimethylaniline.

5. The process according to claim 1 in which the phenolic compound is selected from the group of phenol, 2-methylphenol, 4-chlorophenol, salicylaldehyde, 2-hydroxybenzophenone and methylsalicylate.

6. The process according to claim 1 in which the α-olefin is propylene, the organometallic compound is ethylaluminum sesquichloride, the ligand of the formula:

$$NR_1R_2R_3$$

is aniline and the phenolic compound is phenol.

7. The process according to claim 1 in which the α-olefin is propylene, the organometallic compound is ethylaluminum sesquichloride, the ligand of the formula:

$$NR_1R_2R_3$$

is aniline and the phenolic compound is salicylaldehyde.

8. The process according to claim 1 in which the α-olefin is propylene, the organometallic compound is ethylaluminum sesquichloride, the ligand of the formula:

$$NR_1R_2R_3$$

is aniline and the phenolic compound is 3-chlorophenol.

9. The process according to claim 1 in which the α-olefin is propylene, the organometallic compound is ethylaluminum sesquichloride, the ligand of the formula:

$$NR_1R_2R_3$$

is methylaniline and the phenolic compound is methylsalicylate.

References Cited
UNITED STATES PATENTS
3,318,860  5/1967  Eichenbaum _____ 252—429
3,558,518  1/1971  Zuech _____ 252—429

PAUL M. COUGHLIN, JR., Primary Examiner

U.S. Cl. X.R.
252—429 B, 431 N